June 10, 1941.  J. D. NIXON  2,245,007
STUFFING BOX
Filed Dec. 14, 1940
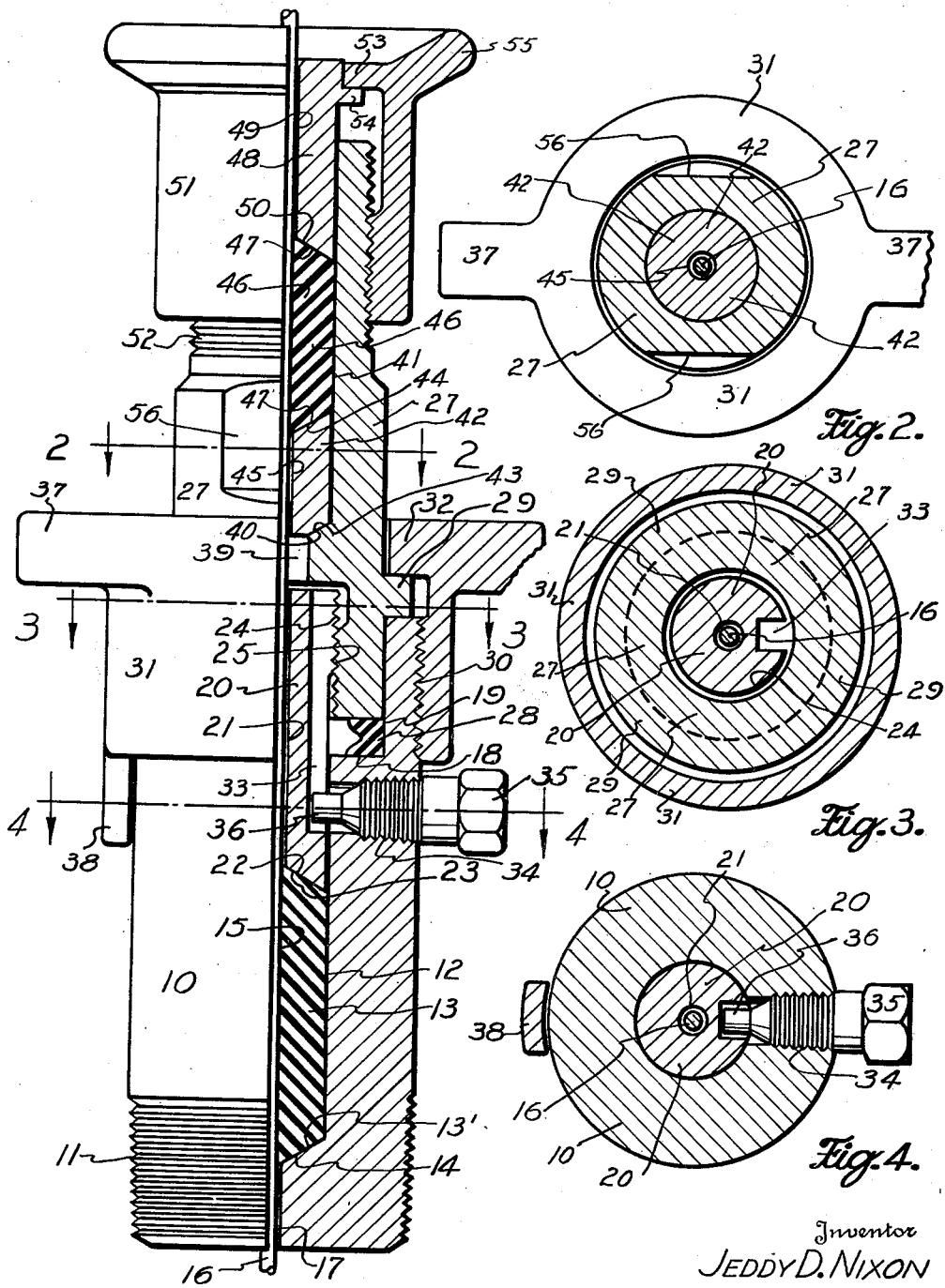
Inventor
JEDDY D. NIXON
By Jack Ashley Jr.
Attorney Patented June 10, 1941

2,245,007

UNITED STATES PATENT OFFICE 2,245,007

STUFFING BOX

Jeddy D. Nixon, Houston, Tex., assignor of one-half to Wilson Supply Company, Houston, Tex., a corporation of Texas Application December 14, 1940, Serial No. 370,100

3 Claims. (Cl. 286—34)

This invention relates to new and useful improvements in stuffing boxes.

In the petroleum and other industries, where an elongate member, such as a rod, a wire line or a sucker rod, or some similar member, is moved longitudinally, it is customary to place a stuffing box to pack off around the member so that fluids may not leak through the opening through which the line or rod reciprocates. In many instances, the line or rod is undergoing substantially continuous reciprocating motion so that considerable wear upon the packing member within the stuffing box is incurred. Therefore, it becomes necessary to replace the packing member. Such a procedure is difficult and often hazardous due to the fact that there is no means provided for sealing or packing off around the wire line or sucker rod while the worn packing member is being replaced.

It is, therefore, one object of this invention to provide an improved stuffing box having a plurality of packing members for packing off an elongate member movable longitudinally therein.

Another object of the invention is to provide an improved stuffing box wherein one packing member packs off a wire line, and another packing member is arranged so as to pack off the wire line when the first packing member is being replaced; and wherein the second packing is not utilized except when the first member is being replaced so that the second member is subjected to a minimum of use and wear and rarely, if ever, needs replacing.

Still another object of the invention is to provide an improved stuffing box wherein the normally inactive packing element may not be accidentally or negligently tightened so that injury to or wear on the element, due to such tightening, is eliminated and the operating life of the member thus greatly prolonged.

An important object of the invention is to provide an improved stuffing box having a pair of packing elements, one disposed above the other, and arranged so that they may be made alternately active, whereby one packing element may be utilized to pack off a member reciprocating in said box; while the other packing element, which is normally released from packing engagement with said member, may be brought into packing engagement with said member when said first named packing element becomes worn and must be replaced.

Another object of the invention is to provide an improved stuffing box wherein the gland or follower adjusting means of the normally inactive packing element co-acts with the upper box body to secure said box to the lower box body; and wherein a locking means is arranged to fasten the aforesaid parts in position, and a means is provided for preventing disconnection of the parts for the purpose of preventing a blow-out.

A further object of the invention is to provide an improved stuffing box in which there is only one joint which must be sealed against leaks by a packing ring.

A still further object of the invention is to provide an improved stuffing box in which the retainer means for the normally inactive packing member may not be accidentally unscrewed so as to allow the packing member to be blown out of the stuffing box by fluid pressure within the well bore.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a longitudinal view, partly in elevation and partly in section, of a stuffing box constructed in accordance with the invention;

Figure 2 is a horizontal, cross-sectional view taken on the line 2—2 of Figure 1;

Figure 3 is a horizontal, cross-sectional view taken on the line 3—3 of Figure 1; and Figure 4 is a horizontal, cross-sectional view taken on the line 4—4 of Figure 1.

In the drawing, the numeral 10 designates a cylindrical stuffing box body having a screw-threaded pin 11 formed on its lower end. The body 10 will be referred to hereinafter as the lower stuffing box body. The pin 11 allows the box body to be mounted above and connected to a suitable piece of equipment, such as, a well head, or a tubing head, or a T, or in any other desirable location. An axial bore 12 extends from the upper end of the body 10 to a point spaced from the lower end thereof and forms a chamber to receive a cylindrical packing element 13. The lower end of the bore 12 is tapered toward the center of the body so as to form an annular beveled shoulder 14, and the packing element 13 may be of any suitable material and may be provided with a conical lower end 13', if desired, which rests upon said shoulder. The packing is preferably of the split type and is formed with a reduced, axial opening 15, which receives an elongate member 16. A similar axial opening 17 extends from the lower end of the bore 12 to the lower end of the body 10, and is in vertical alinement with the bore 15, so as to receive the elongate member 16.

The upper end of the bore 12 is enlarged so as to form an internal, annular shoulder 18 and a counterbore 19. A follower gland 20 has its lower end disposed in the upper portion of the bore 12 and extends upwardly into the counterbore 19. The gland is provided with an axial bore 21 to receive the member 16, and has its bottom side 22 dished to force the upper end of said packing 13 inwardly, or said packing may have a conical upper end 23 to complement said dished surface. The follower gland is adapted to be moved downwardly so as to force the packing element, which is formed of some suitable packing material, to pack off around the member 16. The dished bottom side 22 of the gland and the beveled shoulder 14 serve to force the packing toward the member 16 whereby a snug and efficient packing off is obtained.

The upper end of the gland 20 is provided with raised, external screw threads 24 for engaging in an internally screw-threaded box 25 which depends from the lower end of an upper stuffing box body 27. An annular, pressure-seal packing ring 28 is supported upon the shoulder 18, and the lower end of the box 25 engages the upper side of the ring. The upper body 27 is provided with an external, annular flange 29 which engages the upper end of the lower body 10 so as to support said upper body. The upper end of the lower body 10 has formed thereupon external screw threads 30 for receiving an internally screw-threaded retaining collar 31. This collar 31 is provided at its upper end with an inwardly-projecting, internal, annular flange 32 which overlies the flange 29 of the upper body, so as the collar is screwed downwardly, said flange 29 is clamped between the flange 32 of the retaining collar and the upper end of the lower body 10. In this manner, the upper body 27 is clamped and securely mounted upon the upper end of the lower body 10.

The retaining collar 31 may be rotated slightly so as to raise it out of engagement with the flange 29. The upper body 27 is then free to rotate with respect to the lower body 10. Rotation of the upper body will cause the follower gland 20 to move downwardly by reason of the screw threads 24. This action distorts the packing element 13 into a packed-off position around the member 16. Tightening of the retaining collar 31 will further pack-off or distort the packing element into a packed-off position, and will clamp the upper body onto the lower body.

As will be seen in Figures 1, 3 and 4 of the drawing, the follower gland 20 is provided with a longitudinal groove 33 in its outside wall. The groove 33 extends from the upper end of the gland to a point spaced slightly above the lower end thereof. The lower body 10 is formed with a radial, screw-threaded opening 34 which is disposed slightly below the shoulder 18. A machine screw 35 engages within the opening 34, and is provided with an axial, reduced guide pin or stud 36 upon its inner end. The stud 36 projects into the bore 12 and engages within the groove 33. Thus, the gland 20 is free to move upwardly and downwardly with respect to the body 10, but is prevented from rotating with respect to the body by the stud 36. In this manner, the rotation of the upper body 27 causes the gland to move upwardly and downwardly with respect to the body 10 and the packing element 13.

It is also to be noted that the pressure-seal packing ring 28 seals the only joint between the upper body 27 and the lower body 10 and fluids are prevented from leaking through this joint by this ring 28. The only other direction in which fluids might pass or leak is upwardly around the member 16, through the upper body 27. This path is blocked by a second stuffing box to be described hereinafter. Thus, the entire device is protected against leaks.

The retaining collar 31 is provided with a pair of diametrically-opposed, radially-extending ears 37 which aid in the rotation of the collar. If desired, the ears may be struck by an instrument (not shown) so as to tighten or loosen the collar. This collar is also provided with a depending stop lug 38, which extends downwardly from the lower edge thereof, sufficiently to engage the outer end of the bolt 35, so that the rotation of said collar is limited to one revolution. The provision of this lug prevents a workman from removing the collar and allowing the fluids under pressure within the body 10 to blow the follower gland 20 and the packing element 13 out of the body, whereby the fluids would escape.

The upper body 27 is provided with an axial bore 39 extending upwardly from the box 25. The bore 39 is enlarged near its lower end to form an annular, beveled shoulder 40 and a counterbore 41 that extends upwardly to the upper end of the upper body. The member 16 extends through the bore 39 and the counterbore 41 and out the upper end of the device.

A cylindrical bushing 42, having a frustro-conical lower end 43, is positioned within the counterbore 41, so as to rest upon the shoulder 40. The upper end 44 of the bushing is dished, and an axial bore 45 for receiving the member 16 extends through the bushing. A cylindrical packing element 46 is disposed in the counterbore above the bushing and rests thereupon. The packing element 46 may have conical upper and lower ends 47, as shown in the drawing, so as to complement the dished upper end 44 of the bushing and the follower gland to be described hereinafter, or said packing may be of any desired shape and material. This element is formed of some suitable packing material, and is preferably split longitudinally, so that it may be placed around the member 16.

A follower gland 48 is positioned in the counterbore 41 above the packing element 46 and extends above the upper end of the body 27. The gland 48 carries an axial bore 49 through which the member 16 passes, and has its lower end 50 dished to complement the conical upper end 47, if used, of the packing element. The dished lower end 50 of the gland 48 and the dished upper end of the bushing 42 serve to press the packing element toward the member 16, so that a more efficient packing or sealing off is had.

A retaining cap 51 is connected by means of screw threads 52 to the upper end of the upper body 27. The cap is provided at its upper end with an inwardly-projecting, annular flange 53, which overlies an external, annular flange 54 formed upon the follower gland 48, near the upper end thereof. As will be seen in Figure 1 of the drawing, the cap 51 may be screwed downwardly so that the flange 53 on the cap engages the flange 54 on the gland 48. Further downward movement of the cap will force the gland downwardly, thereby distorting the packing element 46 into a packed-off position. As the packing element wears away during the operation of the device, the cap may be further rotated so as to move the gland 48 farther downwardly and maintain the packing element in a packed-off position.

The retaining cap 51 is provided at its upper end with an outwardly and upwardly directed, marginal flange 55. This flange serves to catch and retain fluids which might chance to run down the elongate member 16, and provides a hand grip whereby the cap may be rotated by hand to distort the packing element. Wrench faces 56 are provided also on the outside of the upper body 27, so that a suitable tool (not shown) may be applied to the body to rotate it and distort the lower packing element 13 into a packed-off position.

In the operation of the stuffing box, the upper packing element 46 is utilized to pack off the member 16. Ordinarily, the lower packing element 13 remains undistorted and is not in operation. When the upper packing element wears to such a point that it is desirable to replace it, the retaining collar 31 is rotated to such an extent as to free the flange 29. The upper body 27 is then rotated in a right-hand direction by means of the wrench faces 56 until the follower gland 20 has moved downwardly sufficiently to distort the packing element 13 into a packed-off position. Then the collar 31 is tightened to clamp the upper body 27 in place.

The retaining cap 51 may now be loosened and removed, and the follower gland 48 and the worn packing element 46 lifted from the counterbore 41. A new packing element is inserted in the counterbore and the follower gland 48 replaced in position above the new packing element. The retaining cap is then replaced and screwed downwardly so as to distort the new packing element into a packed-off position.

After this operation, the retaining collar 31 is again loosened, and the upper body 27 is rotated in a left-hand direction, so as to raise the follower gland 20 and remove the lower packing element 13 from engagement with the member 16. The collar 31 is then again tightened so as to clamp the upper body in place. The stuffing box may now be used until the upper packing element 46 again wears down, at which time the operation given hereinbefore is repeated. It is to be noted that the lower packing element 13 undergoes wear only when the upper packing element 46 is being replaced. Thus, the lower element receives a minimum of wear, and will last an indefinite length of time.

It is also to be noted that the member 16 is packed off at all times, even when the upper element 46 is being replaced, so that no loss of fluids occurs. Thus, a stuffing box is provided in which the packing element may be replaced without the loss of any fluids and without the interrupting or impeding the movements of the member 16; and which may not be accidentally or negligently disassembled by a workman so as to allow fluids to escape from the body 10 out of control.

Various changes, alterations and modifications may be made in the size, shape and arrangement of the herein described elements, within the scope of the appended claims.

What I claim and desire to secure by Letters Patent is:

1. A duplex stuffing box including, a lower stuffing box having a packing element therein, a packing gland in said box resting on said packing, an upper stuffing box having a packing element therein, means for distorting the upper packing element, means for securing the boxes together to prevent the rotation of the upper box except when the securing means is loosened, stop means for preventing the securing means from being loosened to such an extent as to allow the boxes to be separated, and a connection between the upper box and the said gland, whereby rotation of the upper box causes said packing gland in the lower box to distort the lower packing element, said stop means also serving to prevent relative rotation between the lower gland and said lower box.

2. A duplex stuffing box including, a lower stuffing box having a packing element therein, a packing gland in said box engaging said packing, an upper stuffing box having a packing element therein, means for distorting the upper packing element, means for clamping the boxes together to prevent the rotation of the upper box on the lower box except when the clamping means is loosened, stop means for preventing the clamping means from being loosened to such an extent as to allow the boxes to be separated, a connection between the upper box and the lower box, whereby rotation of the upper box causes the packing gland in the lower box to distort the lower packing element, and means for preventing relative rotation between said gland and said lower stuffing box when said upper box is being rotated to distort the lower packing element or to release said distorton.

3. A duplex stuffing box including, a lower stuffing box having a packing element therein, a packing gland in said box engaging said packing, an upper stuffing box having a packing element therein, a packing gland in said box for engaging said packing element, a cap threaded on said upper box for engaging said upper packing gland to distort said upper packing element, cap means for clamping the boxes together to prevent the rotation of the upper box on the lower box except when said cap means is loosened, stop means comprising a lug on said cap to prevent the clamping means from being loosened to such an extent as to allow the boxes to be separated, a connection between the upper box and the lower box comprising a depending skirt on said upper box for threadably engaging said lower gland, whereby rotation of the upper box causes the packing gland in the lower box to distort the lower packing element, and means for preventing relative rotation between said lower gland and said lower stuffing box when said upper box is being rotated to distort the lower packing element or to release said distortion.

JEDDY D. NIXON.